United States Patent [19]
Spurlin

[11] 4,218,929
[45] Aug. 26, 1980

[54] VIBRATORY DEVICE FOR FEEDERS AND THE LIKE
[75] Inventor: William V. Spurlin, Indiana, Pa.
[73] Assignee: Syn-Energy, Inc., Indiana, Pa.
[21] Appl. No.: 858,341
[22] Filed: Dec. 29, 1977
[51] Int. Cl.² .................. B06B 1/16; B65G 27/20
[52] U.S. Cl. ..................................... 74/61; 198/770
[58] Field of Search .................. 198/761, 770; 209/366.5, 367; 74/61, 87; 310/81

[56] References Cited

U.S. PATENT DOCUMENTS

| | | | |
|---|---|---|---|
| 1,455,907 | 5/1923 | Daman | 209/367 |
| 1,995,435 | 3/1935 | Overstrom | 209/366.5 X |
| 2,729,332 | 1/1956 | Gruner | 74/61 X |
| 2,967,434 | 1/1961 | Mahlfeldt et al. | 78/87 |
| 3,048,260 | 8/1962 | Willis | 198/761 X |
| 3,089,582 | 5/1963 | Musschoot et al. | 198/761 |
| 3,130,831 | 4/1964 | Musschoot | 198/770 |
| 3,251,457 | 5/1966 | Dumbaugh | 198/770 X |
| 3,287,983 | 11/1966 | Austin et al. | 74/61 |
| 3,396,294 | 8/1968 | Makino | 310/81 |
| 3,468,418 | 9/1969 | Renner | 74/61 |
| 3,703,236 | 11/1972 | Spurlin et al. | 74/61 X |
| 3,796,299 | 3/1974 | Musschoot | 198/770 X |
| 4,040,303 | 8/1977 | Makino | 74/61 |

FOREIGN PATENT DOCUMENTS 433927 11/1974 U.S.S.R. ................................. 209/367

*Primary Examiner*—Lawrence J. Staab
*Attorney, Agent, or Firm*—Schuyler, Birch, McKie & Beckett

[57] ABSTRACT

A vibratory device operable as a two mass vibrating system for driving a work member as used in feeders, screens, conveyors and the like, employs a motor driven eccentric weight exciter attached to one mass which is spring coupled to a second mass with the entire device being supported by isolator springs. The spring coupling is adjustable in a generally vertical plane to vary the direction of application of the exciter forces transmitted from the first mass to the second mass to fix this direction as conditions of use call for, the second mass being vibrated with the work member forming a part of such second mass to perform the work produced by the vibratory device in driving the work member. A D.C. brush or brushless motor is particularly useful to drive the exciter for driving relatively small work members to achieve ease of changing the rotative speed of the eccentric weight exciter as conditions dictate.

20 Claims, 18 Drawing Figures

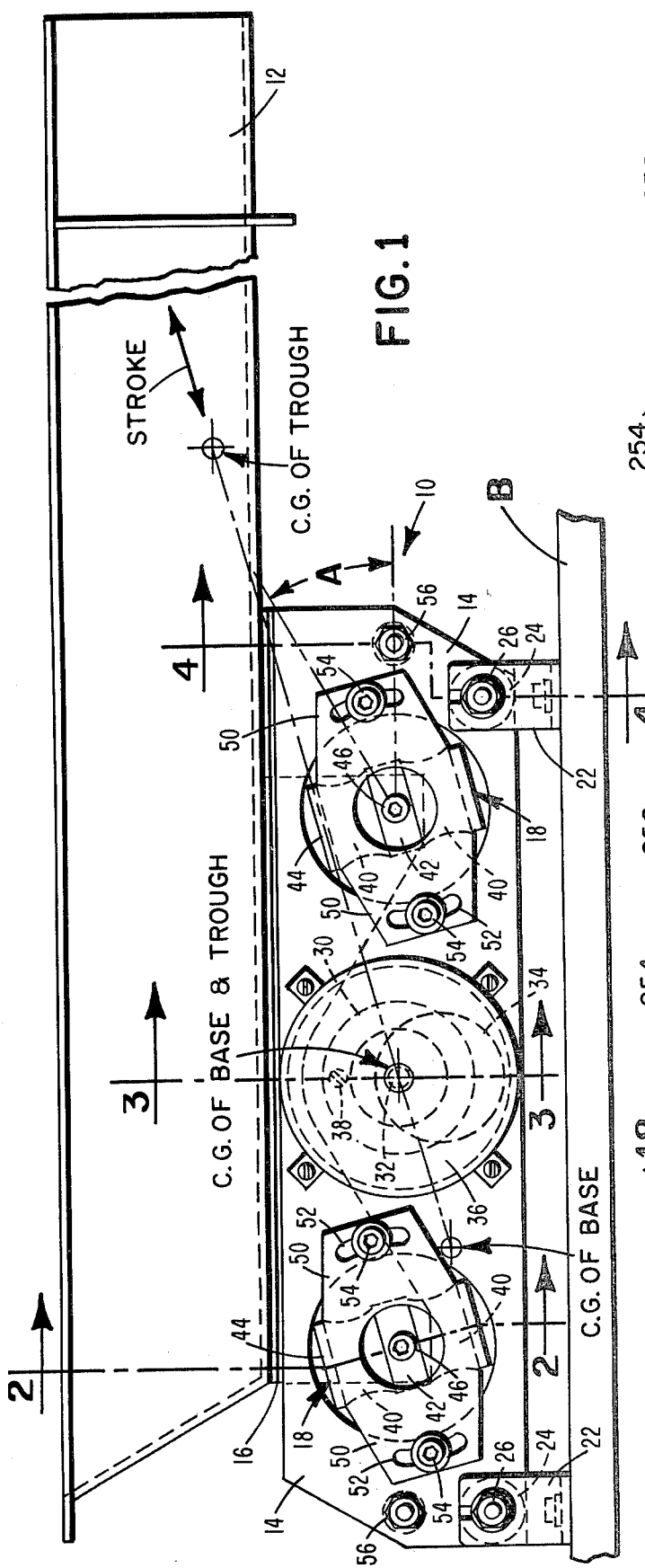
FIG. 1
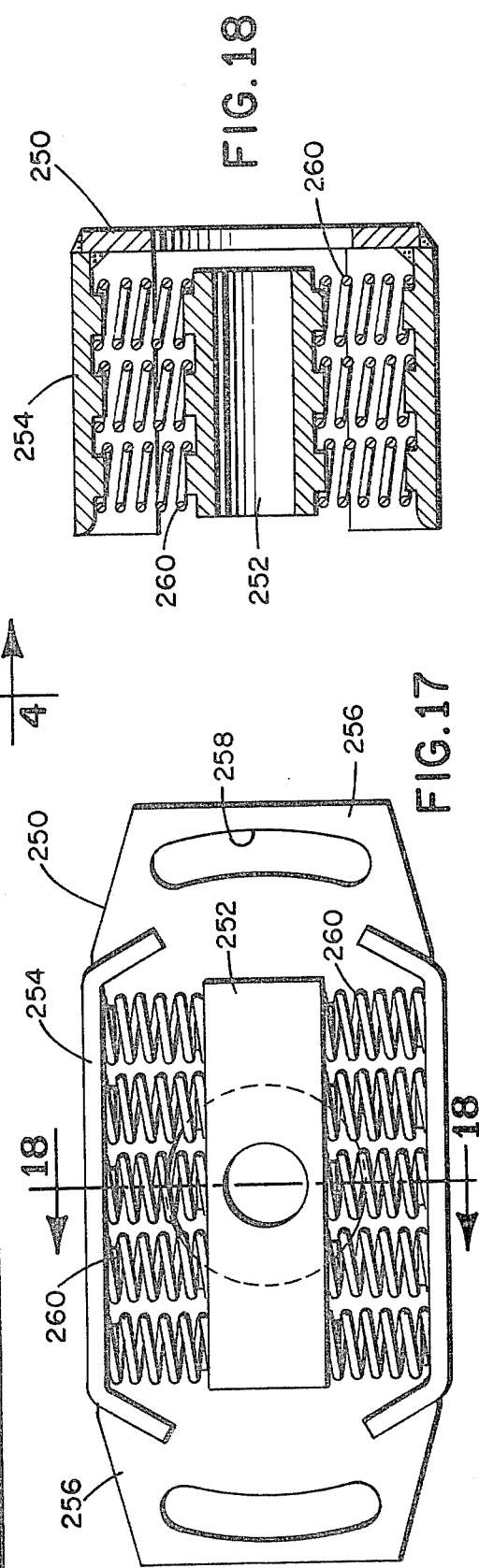
FIG. 18
FIG. 17

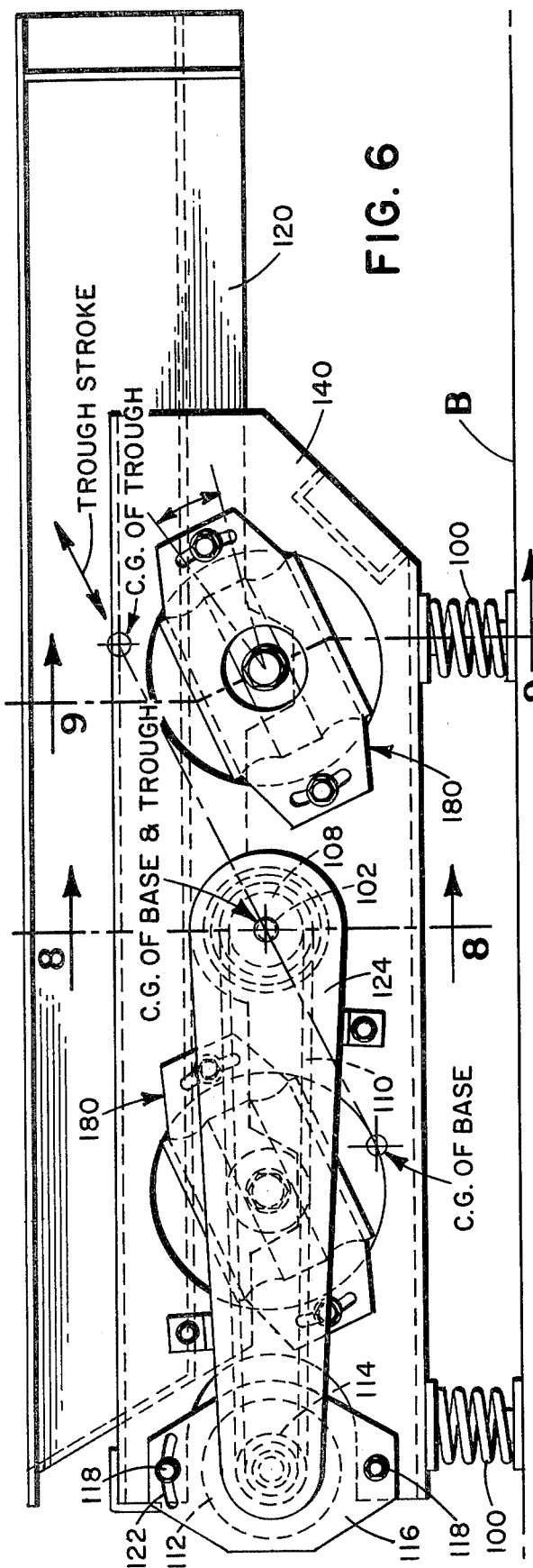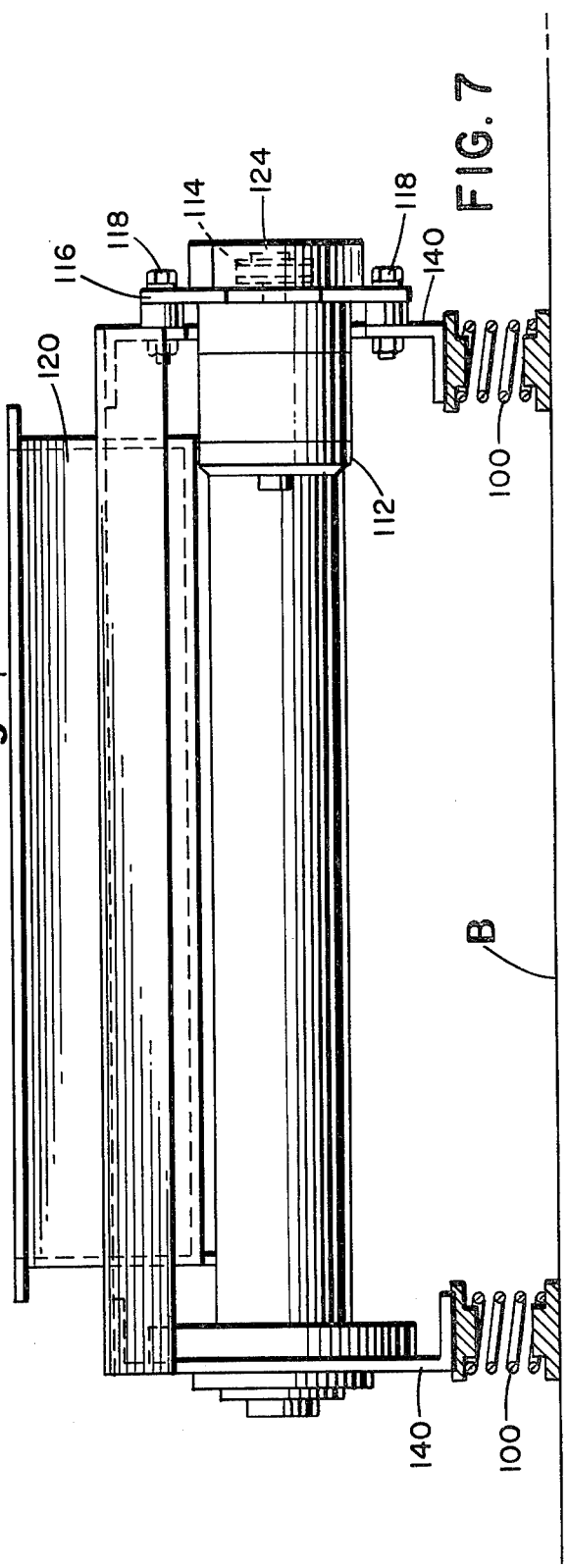

VIBRATORY DEVICE FOR FEEDERS AND THE LIKE

BACKGROUND OF THE INVENTION

1. Field of the Invention

The present invention relates generally to vibratory material handling equipment such as vibratory feeders, screens, grizzleys, conveyors, foundry shakeouts and packers. More particularly, the invention relates to a vibratory device operable as a two mass vibratory system.

2. Description of the Prior Art

There are many proposals both in the prior patent art and in commercial use for the construction of vibratory material handling equipment. The basic differences in these equipment proposals lie in different ways for mounting the work member which is vibrated, such as a trough for feeding material, and differences in the technique by which vibrations are imparted to the work member.

One extensively used device for generating and transmitting vibrations to the work member involves use of an eccentric weight secured to a rotating shaft. The shaft may be the shaft of an electric motor or the shaft may be separate and belt driven by a motor spaced from the shaft. With a separate shaft that is belt driven the shaft itself may be easily formed to have an eccentric portion. More than one eccentric weight may be secured to a rotating shaft to produce vibratory work energy. All of this is known in the prior art.

There are a variety of teachings in the prior art for transmitting the generated vibratory work energy from the exciter to the work member.

It is also known in the prior art and quite extensively used commercially to have fixed angle leaf springs supporting the work member and exciter as a unit above a mounting base. In some vibratory equipment the equipment is suspended or supported on isolating springs with the exciter and work member operating as a two mass vibrating system. In such a system the exciter acts as one mass and the work member as a second mass, the masses designed relative to the natural frequency of the overall system.

SUMMARY OF THE INVENTION

In the instant invention a vibratory device for driving work members used in the feeders, screens, conveyors and other vibratory devices handling bulk material is operable as a two mass vibrating system. A motor driven eccentric weight exciter is employed forming one mass with a frame or other element and a work member forming a second mass. The two masses are spring coupled to transmit the vibratory energy generated by the exciter to the second mass.

This spring coupling between the two masses is adjustable in a generally vertical plane to vary the direction of the application of the exciter forces transmitted from the first mass to the second mass. This adjustability of the spring coupling enables fixing the direction of application of the exciter forces as conditions of use call for. Certain materials and discrete parts can require very specific vertical acceleration of the conveying surface which is fixed by the operating frequency, stroke and angle of spring inclination. It is highly desirable to be able to adjust these parameters to suit the characteristics of the material being handled. Thus, the adjustability of the spring coupling offers great flexibility in providing vibratory equipment which even after being installed at a particular site for use, can be adjusted should the original assembly of the equipment not be completely satisfactory for the use for which it is to be put.

Further, with the invention, the use of a D.C. motor of the brush or brushless type is particularly useful on small feeders and screens.

With the above in mind it is a primary object of this invention to provide a vibratory device operable as a two mass vibrating system wherein the spring means coupling the two masses of the system is adjustable to vary the direction of application of the exciter forces generated on one mass and transmitted through the spring coupling to the second mass, where the masses are isolated from the support at its location of use to eliminate transmitting vibration to the support.

It is a further object of this invention to provide the vibratory device as described in the above object wherein the adjustable spring coupling is exposed at the side of the vibratory device such as to be easily accessible for adjustment as may be called for in the service of the use of the device.

Another object of the invention is to provide a vibratory device incorporating a work member which device can be easily adjusted after being installed to render its operation completely satisfactory for the particular use and type of material being handled.

Also it is an object of this invention to provide a more or less standardized vibratory device which can be built and then have one of a variety of different work members such as a screen, feeder trough, conveyor, etc. mounted on this standard vibratory device.

The above and other objects of the invention will become apparent upon consideration of the details described for preferred embodiments of the invention given in connection with the following drawings.

BRIEF DESCRIPTION OF THE DRAWINGS

FIG. 1 is a side elevational view of one embodiment of the vibratory device of this invention incorporating a feeder trough.

FIG. 6 is a side elevational view of a second embodiment of the invention employing a belt driven eccentric shaft exciter.

FIG. 7 is an elevational view with parts in section of the embodiment of FIG. 6.

FIG. 17 is an elevational view of a spring coupling alternative to the coupling shown in FIG. 15 employing coil springs instead of rubber and, FIG. 18 is a sectional view taken on line 18—18 of FIG. 17.

DESCRIPTION OF PREFERRED EMBODIMENTS

FIG. 1 illustrates one embodiment of the instant invention. Although the vibratory device of this invention is appropriate to a number of different structures wherein vibratory work energy is utilized, the embodiments of the invention are conveniently illustrated in connection with feeders and conveyors. Obviously, the invention may be employed with small feeders, large feeders, straight line parts feeders, screens, grizzleys, conveyors, foundry shakeouts and packers all of which are based on one set of common design parameters.

Figure 2:
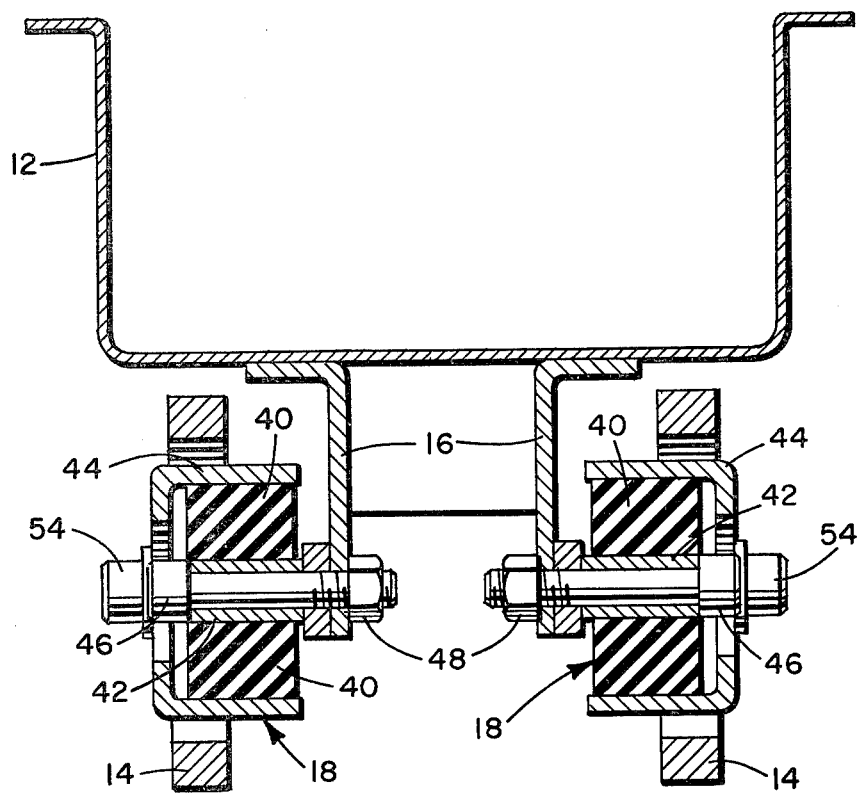
FIG. 2 is a sectional view taken on line 2—2 of FIG. 1.

In FIG. 1 a small feeder 10 including a feeder trough 12, is illustrated. The device operates as a two mass vibrating system with the base 14 forming a first mass which carries a motor driven eccentric weight exciter as will be described and the trough 12 along with the frame 16 which supports the trough 12 forming the second mass of the two mass system. As shown more clearly in FIG. 2 the first mass 14 is coupled to the vibration transmitting springs 18 to transmit vibrations generated by the eccentric weight exciter mounted on the base to the second mass including the work member trough 12 such that the vibratory work energy from the exciter will drive the trough to carry out feeding of material.

Figure 4:
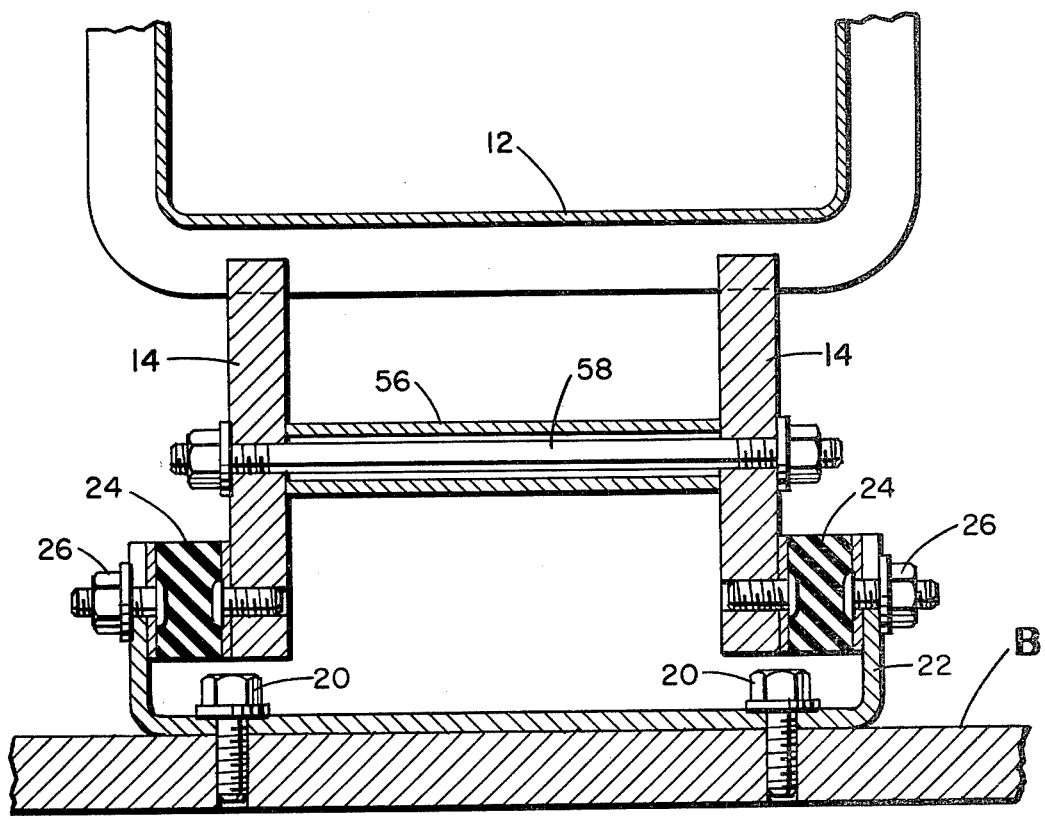
FIG. 4 is a sectional view taken on line 4—4 of FIG. 1.

The base or first mass 14 which carries the eccentric weight exciter is mounted on isolator springs as best illustrated in FIG. 4. A base support B has secured thereto as by bolts 20 a channel section 22, one such channel section being secured to the base B at each end of the vibratory feeder as shown in FIG. 1. The isolator spring is provided by a rubber mounting 24 which comprises a pair of washers bonded to opposite faces of a rubber block. One washer is bolted to channel section 22 by nut and bolt connector 26 while the other washer is secured to the base 14 which is part of the first mass of the two mass vibrating system. The rubber mounting 24 isolates vibrations of the feeder from being transmitted into the structure supporting the vibratory device.

Figure 3:
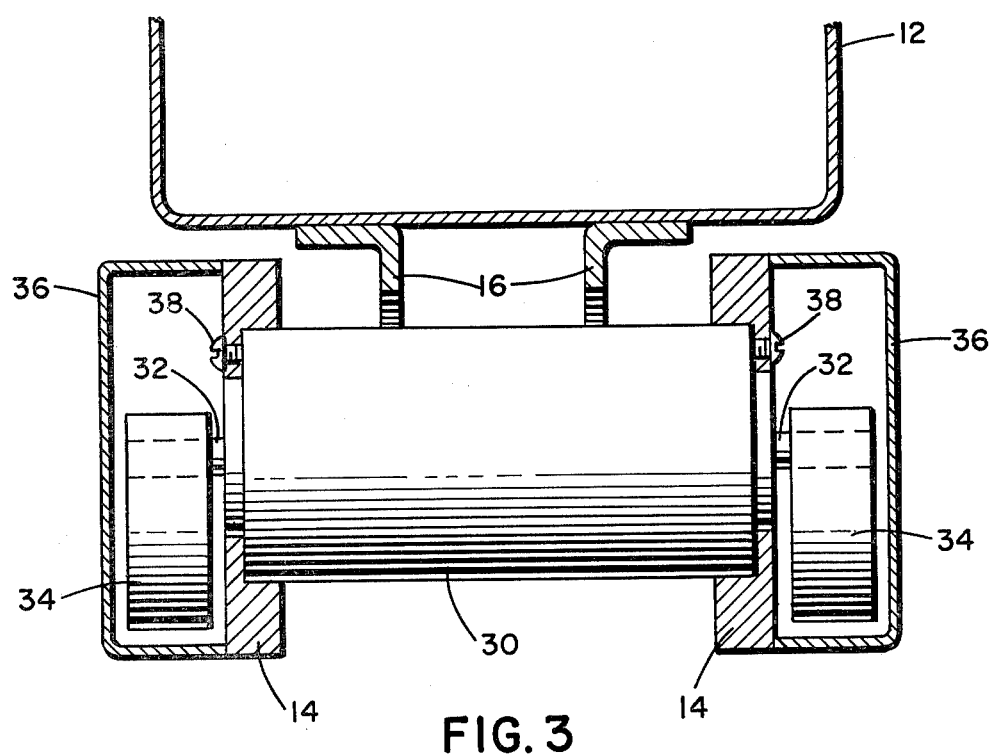
FIG. 3 is a sectional view taken on line 3—3 of FIG. 1.

The motor driven eccentric weight exciter carried by the base is best illustrated in FIG. 3. It comprises, preferably a direct current brush or brushless motor 30 which is mounted on base 14. The motor 30 has a double ended shaft 32. Each end of shaft 32 has an eccentric weight 34 with each eccentric weight protectively enclosed within a cover 36. It will be understood that the motor 30 is appropriately energized through wiring (not shown) to rotate the eccentric weights 34. The motor 30 is appropriately affixed to the base 14 by screws 38.

Figure 15:
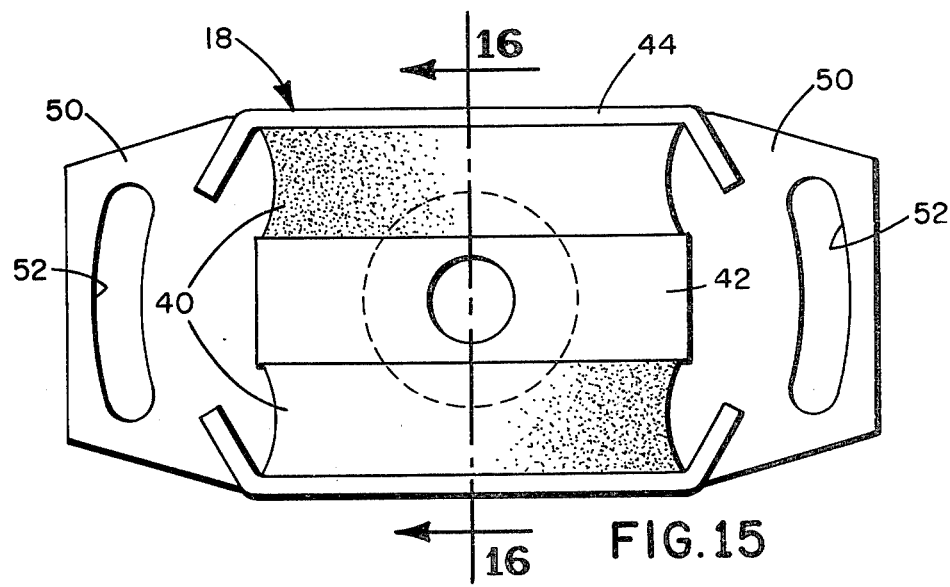
FIG. 15 is an elevational view of a spring coupling assembly employing rubber bonded to the surfaces of inner and outer members which is usable in the instant invention.
Figure 16:
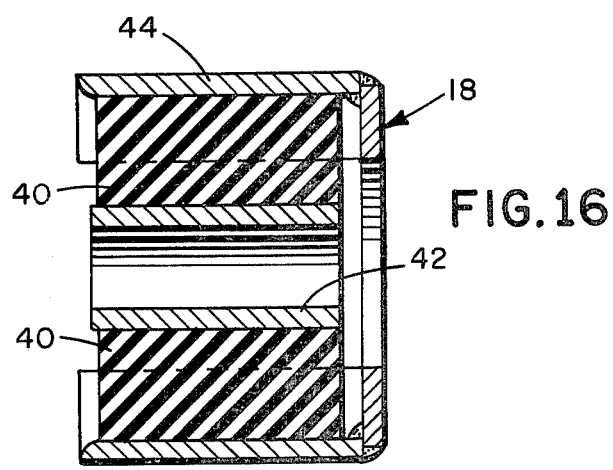
FIG. 16 is a sectional view taken in line 16—16 of FIG. 15.

The coupling springs 18 for transmitting vibration from the exciter carried by the first mass to the second mass consisting of the frame 16 and trough 12 each consist of a pair of rubber blocks 40. The inner wall of each block 40 is bonded to an inner member 42 and the outer wall of each block 40 is bonded to an outer member 44. This structure is shown in FIGS. 15 and 16. Inner member 42 is secured by cap screw 46 to frame 16 by nut 48. Outer member 44, as best seen in FIGS. 1 and 15, has diametrically disposed radially extending tabs 50. These tabs 50 overlie the outer surface of the plates which form the base 14. Each tab 50 has an arcuate slot 52. A threaded fastener 54 extends through each slot 52 and threads into the adjacent plate forming the base 14. By loosening screw 46 and fastener 54 the outer member 44 of the spring coupling may be adjusted relative to the axis of fastener 46 to adjust the direction of application of the vibratory forces from the exciter on the mass forming a part of the base 14 to the second mass formed by frame 16 and trough 12.

Figure 11:
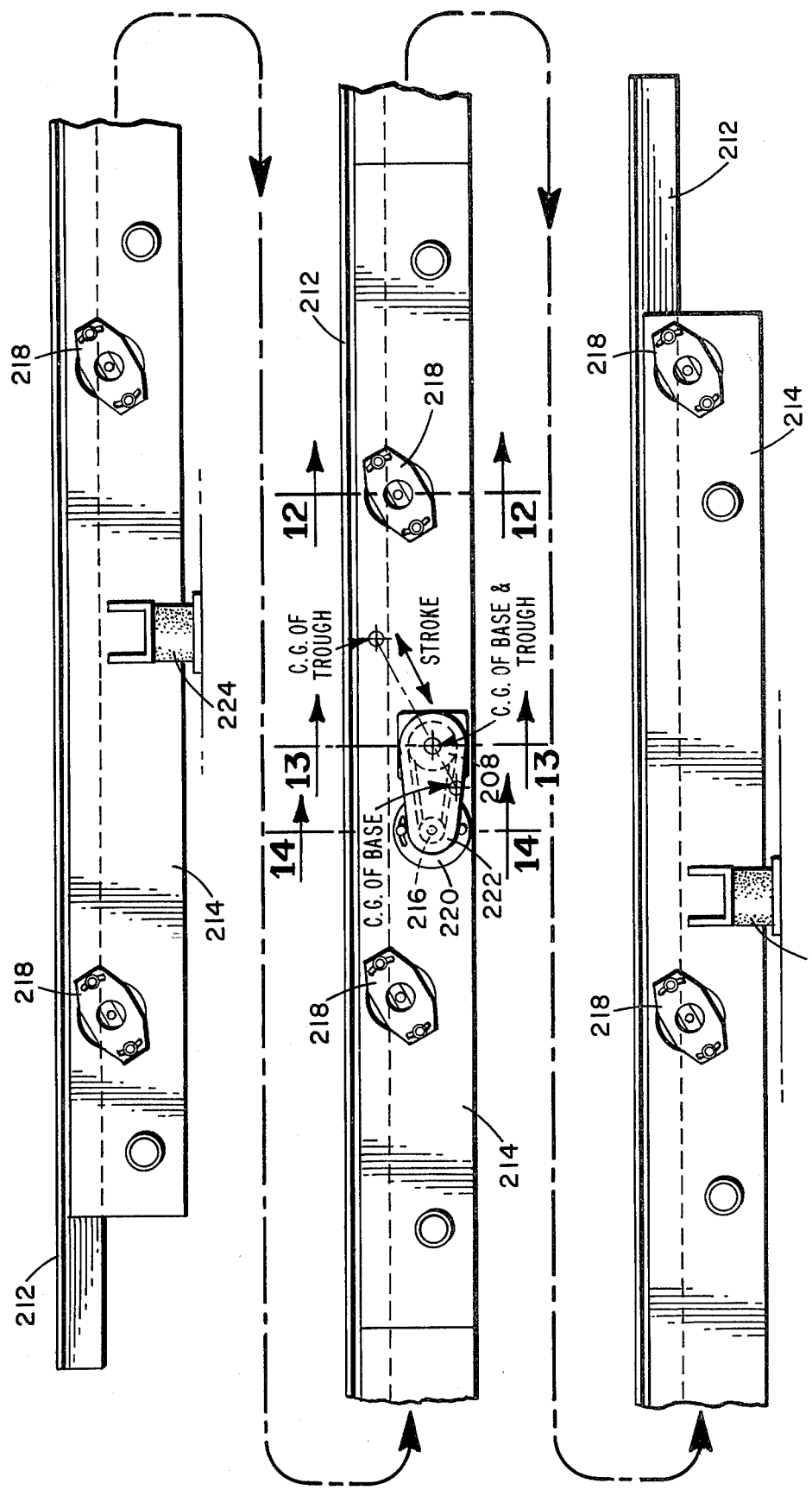
FIG. 11 is a side elevational view of a third embodiment of the invention wherein an elongated conveyor trough forms a part of the vibratory device.
Figure 12:
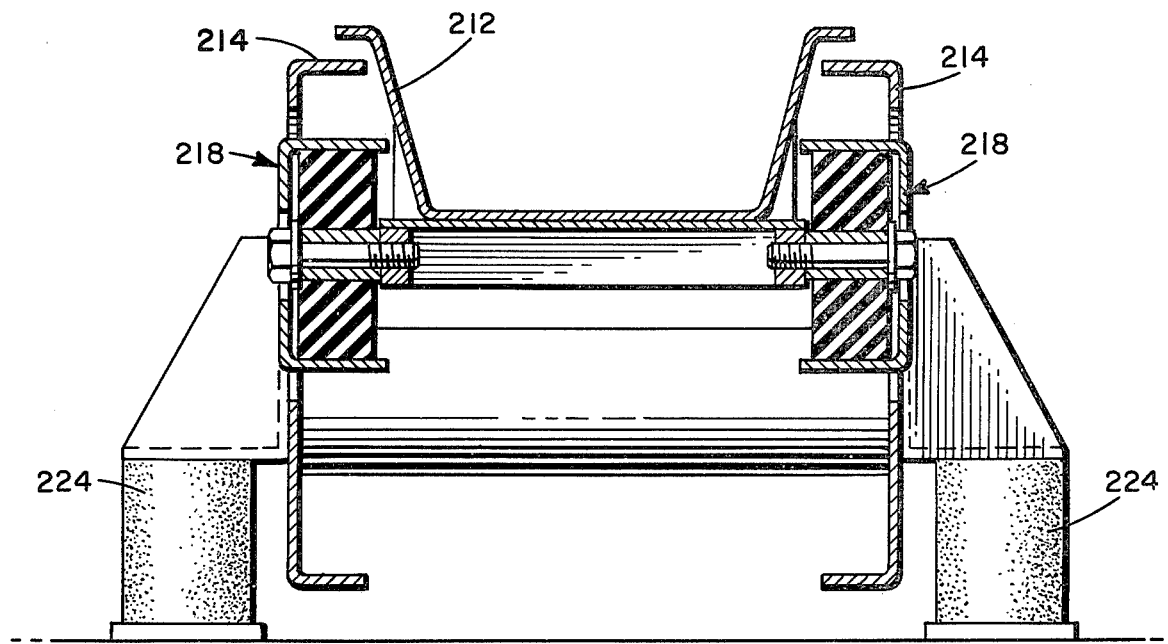
FIG. 12 is a sectional view taken on line 12—12 of FIG. 11.

This variation in adjustment of the spring couplings 18 can be within the arc of the angle A as shown on FIG. 1. Preferably, the exciter eccentric shaft is located with its axis substantially on the center or gravity (C.G.) of the base and trough assembly. Normally the application of force will be generally aligned with the line shown on FIG. 1 extending from the center of gravity of the base 14 through the center of gravity of the trough. The device may be constructed to have the center of gravity of the base below and to the rear of the axis of the exciter, as shown in FIGS. 1, 6 and 11, in which case the adjustment of the coupling springs 18 will have a somewhat different driving effect. In any event the driving springs 18 will be adjusted to match each other. When adjusted upwardly of the line between the two centers of gravity the exciter will impart a greater vertical movement to the feeder trough as compared with the longitudinal vibrations. Likewise when the coupling springs 18 are adjusted downwardly of the line between the two centers of gravity, the longitudinal movement will be greater and the vertical vibrations will be smaller.

A through bolt 58 and a spacer 56 as shown in FIG. 4 serve to hold the plates making up the base 14. As shown in FIG. 1 as least two such bolts and spacers are employed adjacent the ends of the base 14.

Figure 5:
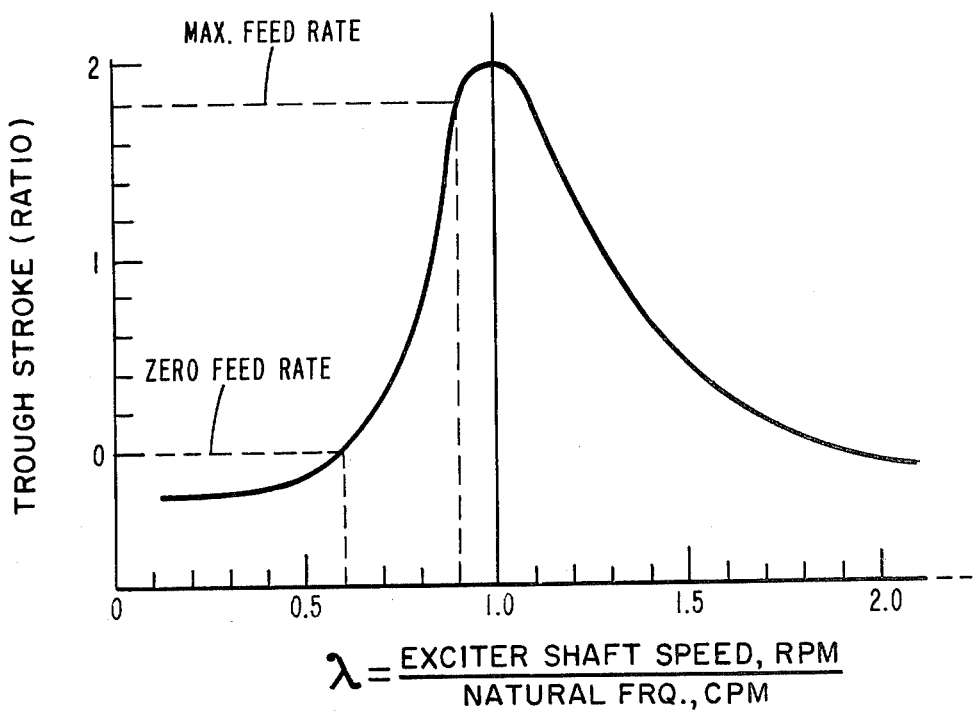
FIG. 5 is a graph showing the vibratory conditions under which the invention operates.

FIG. 5 illustrates by way of a graph typical operating conditions for the vibratory devices of this invention. The peak of the curve represents the resonant speed for vibration where the exciter shaft speed in RPM equals the natural frequency in cycles per minute. Under this condition the quantity of lambda equals 1. However it is not reasonable to operate at the peak or resonant frequency and the apparatus is usually operated about 0.9 which on FIG. 4 is represented by the maximum feed rate. Where the lambda figure is reduced to a ratio of about 0.6 the vibratory device will effectively have a zero feed rate.

FIG. 6 shows a second embodiment of the invention. The basic components are quite similar to the structure of the embodiment of FIG. 1. The base 140 has adjustable coupling springs 180 similar to those already described with respect to the first embodiment. A trough 120 is coupled to the base 140 by the springs 180. As in the case of the earlier embodiment, isolators springs 100 support the vibratory device on the surface B.

Figure 8:
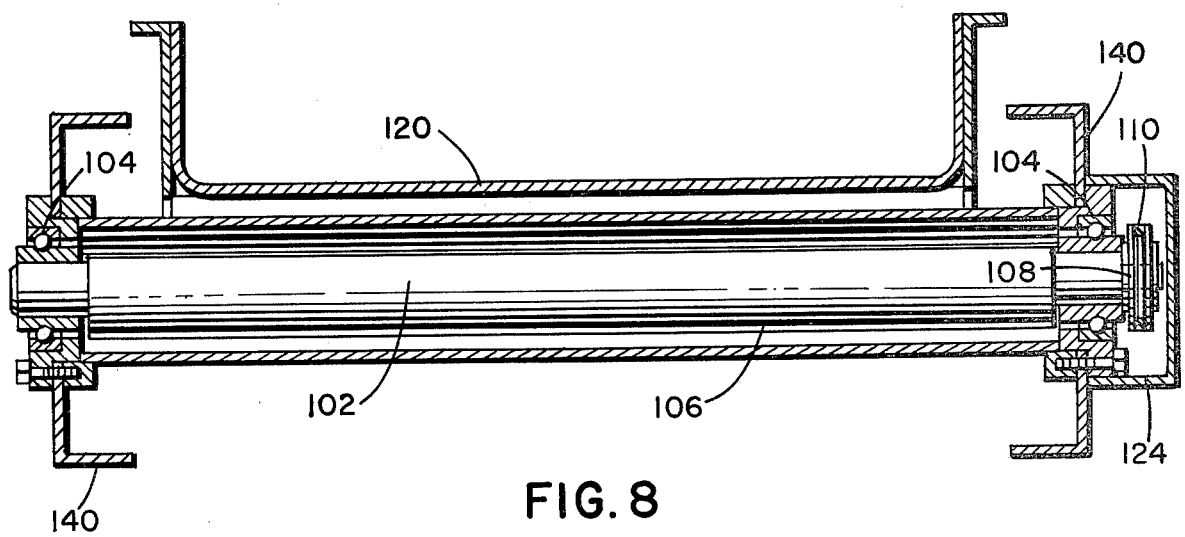
FIG. 8 is a sectional view taken on line 8—8 of FIG. 6.
Figure 9:
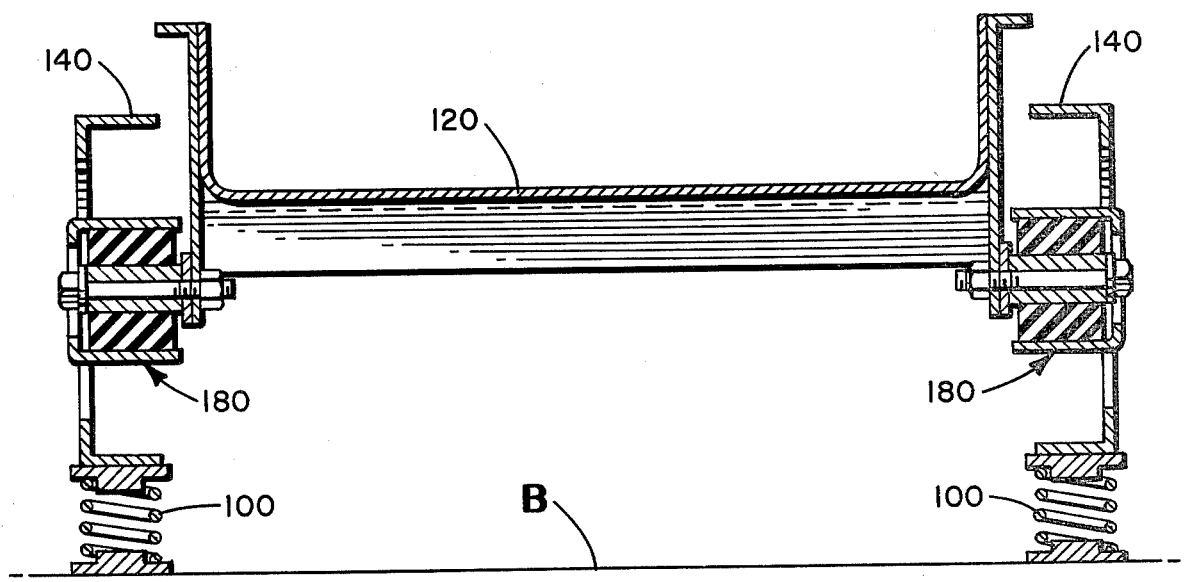
FIG. 9 is a sectional view taken on line 9—9 of FIG. 6.

The basic difference between the first and second embodiments is that a separate shaft 102 is mounted on the base 140 by means of ball or spherical roller bearings 104 carried by the base 140. The shaft 102 has an eccentric portion 106 such that upon rotation of shaft 102 the eccentric portion generates the driving energy vibrations which are transmitted through the coupling springs 180 to the trough 120. One end of shaft 102 carries a pulley 108. A pulley 114 on the motor shaft has the belt 110 drivingly engaged therewith such that appropriate energization of the motor 112 through wiring (not shown) acts to drive the exciter shaft. This pulley, in a single sheave form, is preferably adjustable or of variable pitch such that the driving speed may be simply altered by changing the pulley diameter or pitch even though a constant speed A.C. motor of 1800 RPM or 3600 RPM is used to drive eccentric shaft 102. A belt 110 engages pulley 108 and extends to a motor 112 which is mounted on the base 140 spaced from the axis of eccentric shaft 102. As shown in FIG. 6 the motor may be adjustably mounted on a plate 116 bolted to the base 140 by bolts 118. The plate 116 is arcuately slotted at 112 at one end of the plate to accommodate tightening the belt for proper driving and also enable adjustment of the motor to accommodate different diameters or pitches of the adjustable pulley 114 on motor 112. An appropriate cover 124 may be fastened to the side wall of base 140 to enclose the belt drive and pulleys on the belt drive and pulleys on the motor 112 and eccentric shaft 102. FIGS. 8 and 9 show sectional views through the embodiment of FIG. 6 and FIG. 7 shown an end elevation of FIG. 6 construction.

Figure 10:
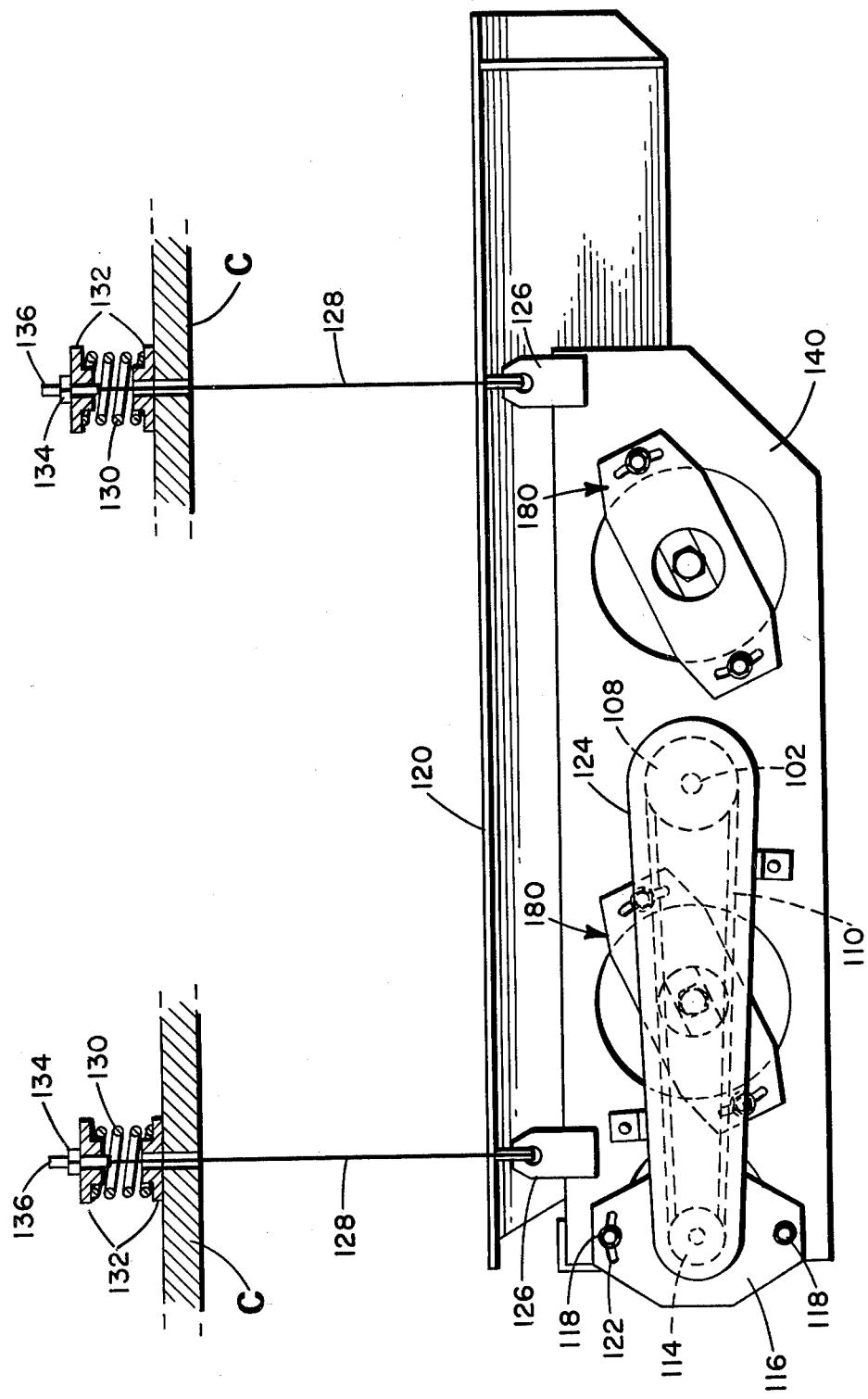
FIG. 10 is an embodiment showing a vibratory device similar to that shown in FIG. 6 with the feeder suspended on isolator springs and cables from an overhead support.

FIG. 10 shows a vibratory device identical to the embodiment of FIGS. 6, 7, 8 and 9. The only difference is that instead of using isolator springs 100 beneath the device to support it from a surface B the device of FIG. 10 is supported from an overhead ceiling C.

The device shown in FIG. 10 has tabs 126 secured adjacent the ends of the base 140 on each side of the base. A wire rope cable 128 is connected to each tab and extends upwardly through openings through the supporting ceiling C. Isolator springs 130 are supported between upper and lower washers 132. Each cable extends through an isolator spring 130 and the washers 132 with the upper end of each cable having a nut 134 threaded onto the connector 136 affixed to the upper end of the cable. Thus, the vibratory device is suspended from the ceiling C and vibrations from the device are eliminated from being transmitted to the supporting structure.

Figure 13:
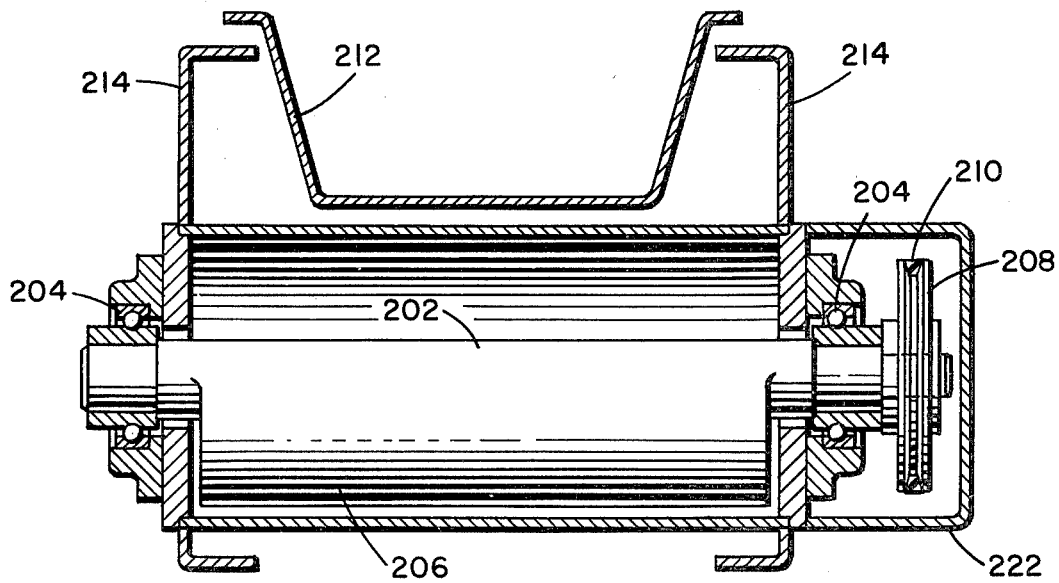
FIG. 13 is a sectional view taken on line 13—13 of FIG. 11.
Figure 14:
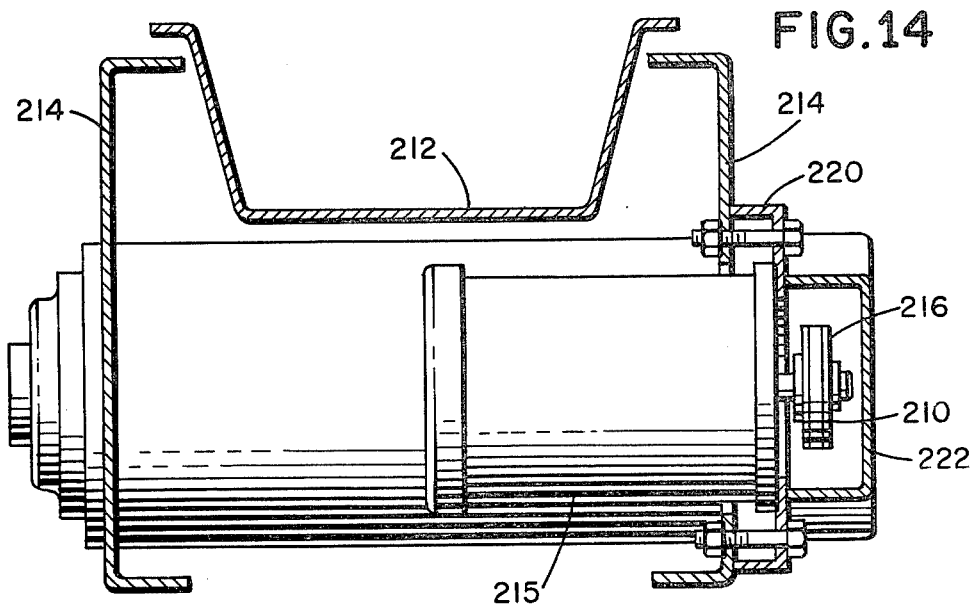
FIG. 14 is a sectional view taken on line 14—14 of FIG. 11.

FIG. 11 shows an elongated conveyor employing the invention in a different application of use. This elongated conveyor has features and construction basically similar to the first embodiment shown in FIG. 1. It has a conveyor trough 212, a base 214 and a series of coupling springs 218 which couple the base and the trough in a manner similar to that previously described for the other embodiments. The base 214 is suitably supported on isolator springs functioning in the same manner as the isolator springs previously described for the other embodiments. A belt driven eccentric weight exciter is mounted on the base 214. This exciter includes an eccentric shaft 202 mounted in bearings 204 at each end of the shaft, these bearings being secured onto the base 214. As shown in FIG. 13 the shaft 202 has an eccentric portion 206 which when the shaft is rotated generates the vibratory energy to drive the conveyor trough 212. A pulley 208 is mounted on the end of shaft 202 and a belt 210 drivingly engages with pulley 208. A motor 215 is mounted on the base spaced from the eccentric shaft 202. It carries pulley 216 with belt 210 drivingly engaging such pulley. The motor may be adjustably mounted on the base 214 by a plate 220 in the same fashion as the motor as described as being mounted on the embodiment of FIG. 6. An appropriate cover 222 may be provided to enclose the belt and pulleys.

The basic operation of the embodiment shown in FIGS. 11, 12, 13 and 14 is the same as the operation for the previously described embodiments.

The base 214 is suitably mounted on isolator rubber blocks 224 supporting the vibratory device above a supporting surface to prevent vibration of the device being transferred to the support.

FIGS. 17 and 18 illlustrate an alternative construction for the coupling springs 18, 180 or 218. The alternative construction of the springs can be substituted for the embodiments previously described where natural rubber or synthetic rubber with the low damping characteristics of natural rubber are employed. The alternative coupling spring 250 has an inner member 252 and an outer member 254 quite similar to the inner and outer members of the previously disclosed coupling springs. The outer member 254 has outwardly extending radial tabs 256 each of which is slotted at 258 to give the adjustable capability characteristics of the other coupling springs. In place of the rubber blocks a series of metal coil springs are disposed between the inner member 252 and outer member 254. These coil springs are under compression and are designed to give a spring rate at least double the shear spring rate in order to stroke only along the line of inclination of the coupling springs. The shear spring rate will determine the natural frequency of the two mass vibratory system and no excitation will occur in the compression direction because the spring rate in compression is much higher than it is in shear. Since natural rubber or synthetic rubber are limited in their capacity of withstanding high temperatures the alternative spring assembly 250 in FIGS. 17 and 18 comes in as suitable for handling high temperature bulk materials.

As previously mentioned a D.C. brush or brushless type motor is particularly suited for small conveyors, feeders or the like. Using a suitable SCR (silicon controlled rectifier) type control (not shown) the maximum set speed for the D.C. motor relative to the natural frequency for the two mass vibratory system may be set and also the D.C. motor speed may be varied downwardly from this maximum set point which will vary the trough stroke and thereby control the rate of flow of the material being handled. A preferred speed for the D.C. motor on small feeders would be between 2000 RPM and 2500 RPM. Also the D.C. motor is simple to control for braking to an instant stop which is required in packaging applications where exact weight control of material fed to a scale is necessary. Use of a D.C. motor is reasonably limited to a maximum trough size of about 10" wide and 30" long.

Where an A.C. drive motor is used the standard speeds available are only 1800 RPM or 3600 RPM. Thus, a V belt drive with a variable pitch pulley is used to set the maximum speed relative to the natural frequency of the two mass spring coupled vibratory system. On large units using multiple V belt drives with plural groove pulleys the exact size of the pulley on the eccentric shaft or pulley on the motor and the shaft would be determined by calculation and actual test at the time of assembly. Variable stroke is obtained by changing the motor speed by a suitable control varying the voltage or frequency of the power supply to the motor.

While several specific embodiments of the invention have been described it will be obvious to those skilled in the art that changes and modification be made without departing from the invention. It is therefore intended in the appended claims to cover all such changes and modifications that fall within the true spirit and scope of the invention.

I claim:

1. A vibratory device operable as a two mass vibrating system for driving a work member as used in vibratory feeders and the like comprising:

a first mass carrying a motor driven eccentric weight exciter means to produce vibratory work energy, a second mass having a work member forming a part of said second mass;

vibration transmitting spring means coupling said masses to transmit said vibratory work energy from said first mass to said second mass, said spring means capable of deflection substantially only in a single direction to apply the exciter forces to said second mass substantially only in said direction, and angularly adjustable relative to both of said masses independently of said exciter means to permit variation in the direction of application of the exciter forces as conditions of use dictate, and isolator springs supporting said masses and spring means to eliminate transmitting vibration into the structure supporting the vibratory device.

2. A vibratory device as recited in claim 1 wherein said exciter means comprises an eccentric weight secured to each end of a double ended shaft motor for the weights to be directly driven by the shaft of said motor.

3. A vibratory device as recited in claim 2 wherein said motor is a D.C. brush type motor.

4. A vibratory device as recited in claim 2 wherein said motor is a D.C. brushless type motor.

5. A vibratory device as recited in claim 1 wherein said exciter means comprises a shaft carried by said first mass with at least one weight eccentrically mounted on said shaft, a pulley secured to said shaft, a motor carried by said first mass, and at least one belt drivingly connecting said motor with said pulley for said motor to drive said shaft.

6. A vibratory device as recited in claim 5 wherein said pulley is of variable pitch whereby the rotative speed of said shaft can be changed in relation to the speed of said motor.

7. A vibratory device as recited in claim 5 wherein said motor is an A.C. type motor.

8. A vibratory device as recited in claim 1 wherein said isolator springs are provided by springs disposed between a support underlying said device and said first mass.

9. A vibratory device as recited in claim 1 wherein said isolator springs are provided by springs interposed in connecting cable means between said first mass and a support overlying said device.

10. A vibratory device as recited in claim 1 wherein said vibration transmitting spring means comprises a plurality of assemblies made up of inner and outer members, vibration transmitting springs disposed in compression between said members, one of said members being connected to said first mass and the other of said members being connected to said second mass, said members being generally aligned with said direction of application of the exciter forces to transmit said vibratory work energy to said second mass in the shear direction of said vibration transmitting springs.

11. A vibratory device as recited in claim 10 wherein said vibration transmitting springs comprise rubber blocks in compression between said members with said rubber being bonded to each of said members.

12. A vibratory device as recited in claim 10 wherein said vibration transmitting springs comprise coil springs in compression between said members.

13. A vibratory device as recited in claim 1 wherein said first mass comprises a base, said second mass comprises a frame carrying said work member, and said spring means comprises a plurality of vibration transmitting assemblies coupling said frame to said base, each of said assemblies mounted to be angularly adjustable in a generally vertical plane relative to said base and said frame.

14. A vibratory device as recited in claim 13 wherein each of said assemblies comprises inner and outer members, vibration transmitting springs disposed in compression between said members, one of said members being connected to said base and the other of said members being connected to said frame, said members being generally aligned with said direction of application of the exciter forces to transmit said vibratory work energy to said frame in the shear direction of said vibration transmitting springs.

15. A vibratory device as recited in claim 14 wherein said base includes a vertical side plate extending along each side of said base, said outer member of each said assembly has slotted radially extending tabs overlying the outer surface of the plate with which it is associated, and first fastening means engage through each tab slot with its associated plate to adjustably secure said outer member to the plate with which it is associated, at least two of said assemblies are associated with each said plate.

16. A vibratory device as recited in claim 15 wherein second fastening means secure said inner member of each of said assemblies to said frame.

17. A vibratory device as recited in claim 16 wherein said fastening means comprise threaded fasteners.

18. A vibratory device as recited in claim 16 wherein said vibration transmitting springs comprise rubber blocks in compression between said members of each said assembly with said rubber being bonded to each of said members within each assembly.

19. A vibratory device as recited in claim 16 wherein said vibration transmitting springs comprise coil springs in compression between said members of each said assembly.

20. A vibratory device as recited in claim 13 wherein said eccentric weight exciter has its axis of rotation located substantially on the center of gravity of the first mass and second mass assembly.

* * * * *